US011756542B2

(12) United States Patent
Aiso

(10) Patent No.: US 11,756,542 B2
(45) Date of Patent: Sep. 12, 2023

(54) AUDIO SIGNAL PROCESSING METHOD, AUDIO SIGNAL PROCESSING SYSTEM, AND STORAGE MEDIUM STORING PROGRAM

(71) Applicant: YAMAHA CORPORATION, Hamamatsu (JP)

(72) Inventor: Masaru Aiso, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 293 days.

(21) Appl. No.: 17/007,440

(22) Filed: Aug. 31, 2020

(65) Prior Publication Data
US 2021/0065710 A1 Mar. 4, 2021

(30) Foreign Application Priority Data
Sep. 3, 2019 (JP) ................................. 2019-160056

(51) Int. Cl.
*G10L 15/22* (2006.01)

(52) U.S. Cl.
CPC ..................................... *G10L 15/22* (2013.01)

(58) Field of Classification Search
None
See application file for complete search history.

(56) References Cited

U.S. PATENT DOCUMENTS

| 6,795,560 B2 | 9/2004 | Hamamatsu |
| 8,189,796 B2 | 5/2012 | Hashizume |
| 9,853,758 B1 * | 12/2017 | Channegowda ........ G10L 15/25 |
| 9,952,826 B2 | 4/2018 | Rowe |
| 2004/0073419 A1 * | 4/2004 | Aoki ...................... H04H 60/04 704/201 |
| 2005/0159833 A1 * | 7/2005 | Giaimo ................... G10L 15/26 704/E15.045 |
| 2008/0226099 A1 * | 9/2008 | Aiso ...................... H04H 60/04 381/119 |
| 2010/0303261 A1 * | 12/2010 | Stieler von Heydekampf ............ H04H 60/04 381/119 |
| 2011/0019840 A1 * | 1/2011 | Okabayashi .............. H04S 7/30 381/119 |

(Continued)

FOREIGN PATENT DOCUMENTS

| CN | 1838573 A | 9/2006 |
| CN | 101005538 A | 7/2007 |

(Continued)

OTHER PUBLICATIONS

Office Action issued in Chinese Appln. No. 202010636165.3 dated Sep. 2, 2021. English translation provided.

(Continued)

*Primary Examiner* — Jonathan C Kim
(74) *Attorney, Agent, or Firm* — ROSSI, KIMMS & McDOWELL LLP

(57) ABSTRACT

An audio signal processing method receives, by a terminal, a backtalk input instruction from a performer, obtains, by a microphone connected to the terminal, voice information from the performer, and outputs, in a case where the backtalk input instruction has been received by the terminal, a backtalk signal corresponding to the voice information obtained by the microphone connected to the terminal to a monitor bus of a mixer.

17 Claims, 10 Drawing Sheets

(56) References Cited

U.S. PATENT DOCUMENTS

| | | | | |
|---|---|---|---|---|
| 2012/0250888 A1* | 10/2012 | Okabayashi | ........... | H04H 60/04 |
| | | | | 381/104 |
| 2014/0029766 A1* | 1/2014 | Gebauer | ................ | H04R 3/005 |
| | | | | 381/119 |
| 2014/0064519 A1* | 3/2014 | Silfvast | .................... | G10H 1/18 |
| | | | | 381/119 |
| 2014/0169768 A1* | 6/2014 | Webb | .................... | H04N 21/854 |
| | | | | 386/285 |
| 2015/0293909 A1* | 10/2015 | Scherrer | ................. | G06F 40/58 |
| | | | | 381/74 |
| 2017/0288798 A1* | 10/2017 | Saito | ........................ | H04S 3/008 |
| 2019/0191261 A1 | 6/2019 | Saito | | |
| 2021/0028796 A1* | 1/2021 | Cook | ..................... | H04R 3/005 |
| 2021/0065710 A1* | 3/2021 | Aiso | ........................ | G10L 15/22 |

FOREIGN PATENT DOCUMENTS

| | | | |
|---|---|---|---|
| CN | 105229947 A | 1/2016 | |
| CN | 109961795 A | 7/2019 | |
| JP | 2002320299 A | 10/2002 | |
| JP | 2005094112 A | 4/2005 | |
| JP | 2007074672 A | 3/2007 | |
| JP | 2008193619 A | 8/2008 | |

OTHER PUBLICATIONS

Office Action issued in Chinese Appln. No. 202010636165.3 dated Apr. 1, 2022. English machine translation provided.

Extended European Search Report issued in European Appln. No. 20193833.9 dated Jan. 21, 2021.

Office Action issued in EP Appln. No. 20193833.9 dated Jan. 18, 2023.

Office Action issued in Chinese Appln. No. 202010636165.3 dated Sep. 1, 2022. English translation provided.

Office Action issued in Japanese Appln. No. 2019-160056 dated May 23, 2023. English machine translation provided.

* cited by examiner

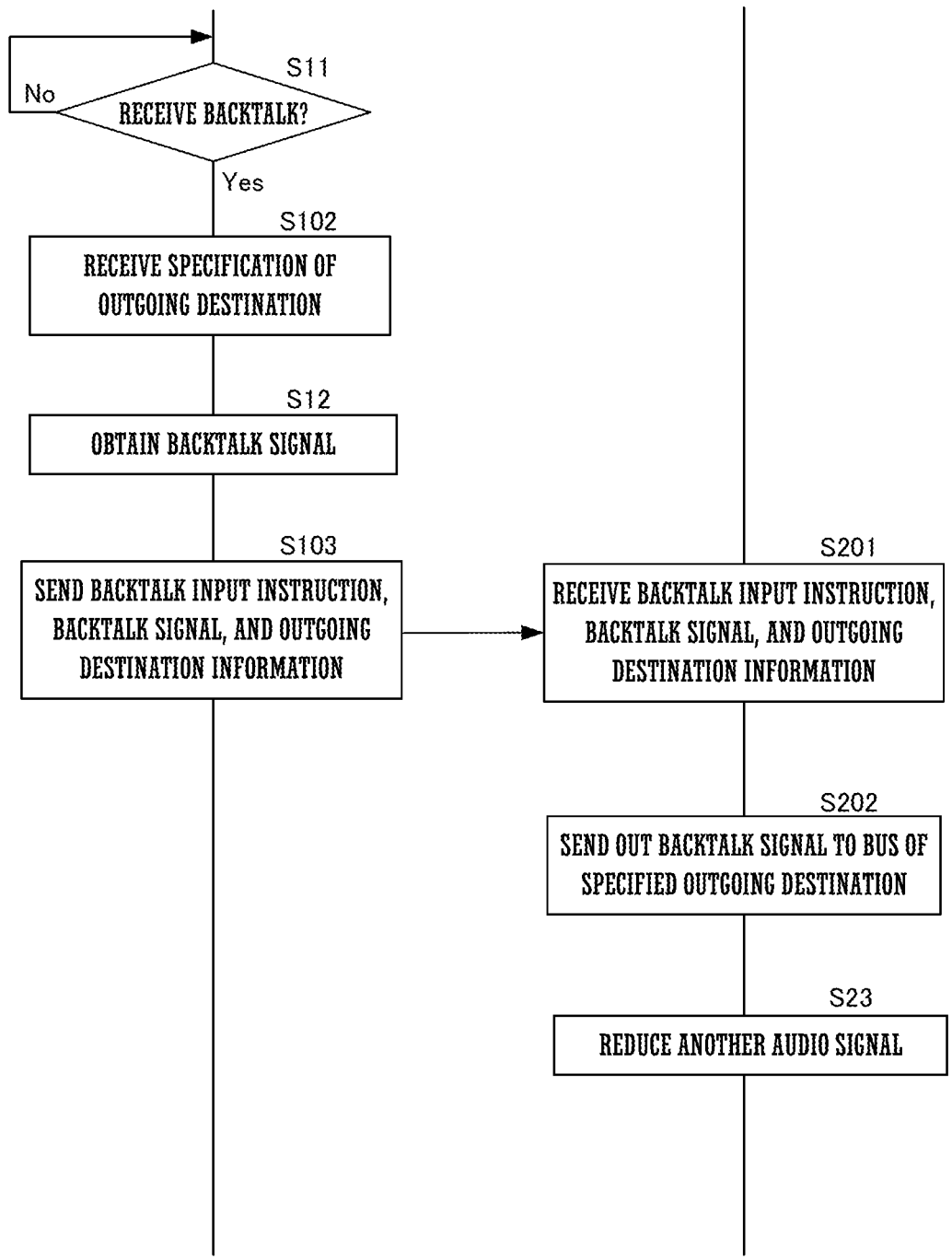

AUDIO SIGNAL PROCESSING METHOD, AUDIO SIGNAL PROCESSING SYSTEM, AND STORAGE MEDIUM STORING PROGRAM

CROSS REFERENCE TO RELATED APPLICATIONS

This Nonprovisional application claims priority under 35 U.S.C. § 119(a) on Patent Application No. 2019-160056 filed in Japan on Sep. 3, 2019 the entire contents of which are hereby incorporated by reference.

BACKGROUND OF THE INVENTION

1. Technical Field

A preferred embodiment of the present invention relates to an audio signal processing method, an audio signal processing system, and a storage medium storing a program.

2. Description of the Related Art

Japanese Unexamined Patent Application Publication No. 2008-193619 discloses a talkback apparatus including a talkback function for talking from an operating person of a mixer to a performer, and a backtalk function for talking from a performer to an operating person (hereinafter referred to as an engineer) of a mixer.

The talkback apparatus disclosed in Japanese Unexamined Patent Application Publication No. 2008-193619 cuts voice from a microphone of the performer to a speaker of the engineer while a talkback switch is ON. In addition, the talkback apparatus disclosed in Japanese Unexamined Patent Application Publication No. 2008-193619 transmits backtalk voice from the microphone of the performer to the speaker of the engineer during a period from when the "ON" of the talkback switch is released to when a preset time set by a predetermined timer reaches.

The backtalk function disclosed in Japanese Unexamined Patent Application Publication No. 2008-193619 becomes usable after the talkback switch is released. Therefore, the performer cannot freely use the backtalk function.

SUMMARY OF THE INVENTION

In view of the foregoing, a preferred embodiment of the present invention is directed to provide an audio signal processing method, an audio signal processing system, and a storage medium storing a program that are able to use a backtalk function at a desired timing of a performer.

An audio signal processing method receives, by a terminal, a backtalk input instruction from a performer, obtains, by a microphone connected to the terminal, voice information from the performer, and outputs, in a case where the backtalk input instruction has been received by the terminal, a backtalk signal corresponding to the voice information obtained by the microphone connected to the terminal, to a monitor bus of a mixer.

According to a preferred embodiment of the present invention, a backtalk function is able to be used at a desired timing of a performer.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a flow chart showing an operation of another audio signal processing system.

DETAILED DESCRIPTION OF THE PREFERRED EMBODIMENTS

As described above, a conventional backtalk function becomes usable after a talkback switch is released. Therefore, a performer cannot freely use the backtalk function. In addition, the conventional backtalk function uses a microphone (a normal microphone for obtaining a performance sound, a singing sound, or the like) of the performer. A signal of the microphone of the performer is outputted to a main output channel and an output channel for a monitor speaker for a performer that the performer uses. However, when the backtalk function is used, the signal of the microphone of the performer needs to be outputted to a monitor speaker for an engineer that an engineer uses. Therefore, the engineer needs to perform a complicated setup in order to achieve a backtalk function using a normal microphone.

An audio signal processing system according to a preferred embodiment of the present invention is able to use a backtalk function at a desired timing of a performer. In addition, the audio signal processing system according to a preferred embodiment of the present invention is able to use the backtalk function, without a need to perform a complicated setup.

Figure 1:
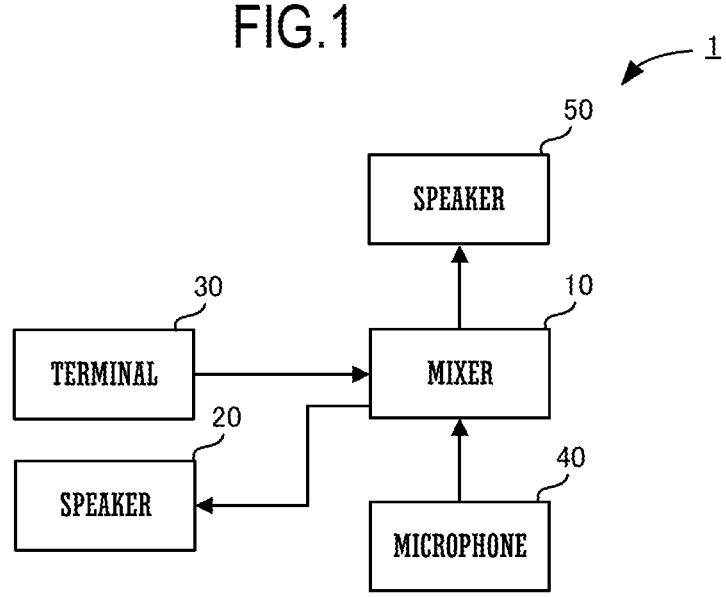
FIG. 1 is a block diagram showing a configuration of an audio signal processing system.

FIG. 1 is a block diagram showing a configuration of an audio signal processing system 1 according to a preferred embodiment of the present invention. The audio signal processing system 1 includes a mixer 10, a speaker 20, a terminal 30, a microphone 40, and a speaker 50. The speaker 20 is an example of a monitor speaker for a performer. The speaker 50 is an example of a monitor speaker for an engineer. The terminal 30 is an information processor (such as a personal computer, a smartphone, or a tablet PC, for example) that a performer uses.

Figure 2:
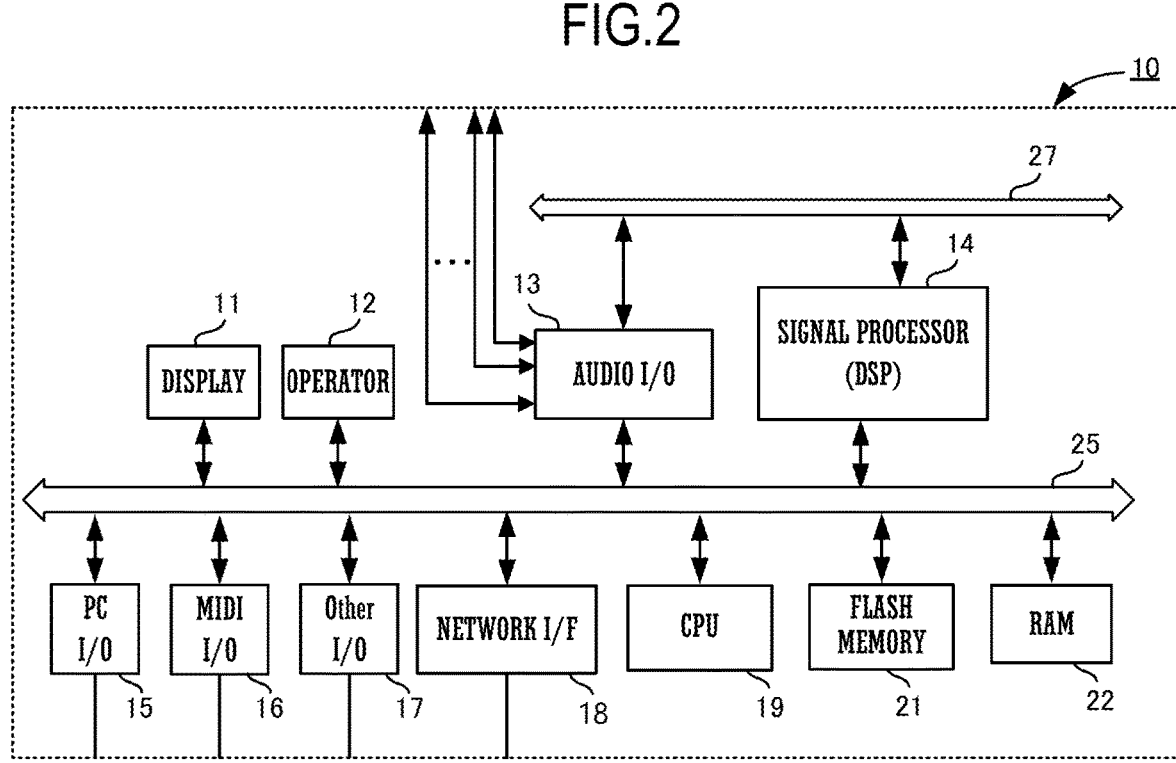
FIG. 2 is a block diagram showing a configuration of an audio mixer.

FIG. 2 is a block diagram showing a configuration of the mixer 10. The mixer 10 includes a display 11, an operator 12, an audio I/O (Input/Output) 13, a signal processor 14, a PC I/O 15, a MIDI I/O 16, a diverse (Other) I/O 17, a network I/F 18, a CPU 19, a flash memory 21, and a RAM 22.

The display 11, the operator 12, the audio I/O 13, the signal processor 14, the PC I/O 15, the MIDI I/O 16, the Other I/O 17, the CPU 19, the flash memory 21, and the RAM 22 are connected to each other through a bus 25. In addition, the audio I/O 13 and the signal processor 14 are also connected to a waveform bus 27 for transmitting an audio signal. It is to be noted that, as will be described below, an audio signal may be sent and received through the network I/F 18. In such a case, the signal processor 14 and the network I/F 18 are connected through a not-shown dedicated bus.

The audio I/O 13 is an interface for receiving an input of an audio signal to be processed in the signal processor 14. The audio I/O 13 includes an analog input port, a digital input port, or the like that receives the input of an audio signal. In addition, the audio I/O 13 is an interface for outputting an audio signal that has been processed in the signal processor 14. The audio I/O 13 includes an analog output port, a digital output port, or the like that outputs the audio signal.

Each of the PC I/O 15, the MIDI I/O 16, and the Other I/O 17 is an interface that is connected to various types of external devices and performs an input and output operation. The PC I/O 15 is connected to an information processor such as a personal computer, for example. The MIDI I/O 16 is connected to a MIDI compatible device such as a physical controller or an electronic musical instrument, for example. The Other I/O 17 is connected to a display, for example. Alternatively, the Other I/O 17 is connected to a UI (User Interface) device such as a mouse or a keyboard. Any standards such as Ethernet (registered trademark) or a USB (Universal Serial Bus) are able to be employed for communication with the external devices. The mode of connection may be wired or wireless.

The network I/F 18 communicates with a different apparatus such as the terminal 30 through a network. In addition, the network I/F 18 receives an audio signal from the different apparatus through the network and inputs a received audio signal to the signal processor 14. Further, the network I/F 18 receives the audio signal on which the signal processing has been performed in the signal processor 14, and sends the audio signal to the different apparatus through the network.

The CPU 19 is a controller that controls the operation of the mixer 10. The CPU 19 reads out a predetermined program stored in the flash memory 21 being a storage medium to the RAM 22 and performs various types of operations. It is to be noted that the program does not need to be stored in the flash memory 21 in the own apparatus. For example, the program may be downloaded each time from another apparatus such as a server and may be read out to the RAM 22.

The display 11 displays various types of information according to the control of the CPU 19. The display 11 includes an LCD or a light emitting diode (LED), for example.

The operator 12 receives an operation with respect to the mixer 10 from an engineer. The operator 12 includes various types of keys, buttons, rotary encoders, sliders, and the like. In addition, the operator 12 may include a touch panel laminated on the LCD being the display 11.

The signal processor 14 includes a plurality of DSPs (Digital Signal Processors) for performing various types of signal processing such as mixing processing or effect processing. The signal processor 14 performs signal processing such as mixing processing or effect processing on an audio signal to be supplied from the audio I/O 13 through the waveform bus 27. The signal processor 14 outputs a digital audio signal on which the signal processing has been performed, to the audio I/O 13 again through the waveform bus 27.

Figure 3:
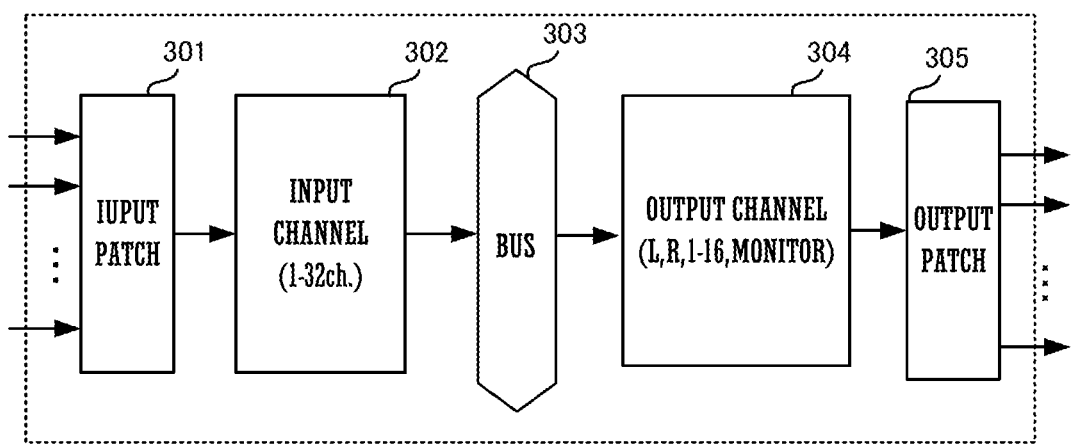
FIG. 3 is an equivalent block diagram of signal processing to be performed by a signal processor 14, an audio I/O 13, and a CPU 19.

FIG. 3 is a block diagram showing a function of signal processing to be performed in the signal processor 14, the audio I/O 13, and the CPU 19. As shown in FIG. 3, the signal processing is functionally performed through an input patch 301, an input channel 302, a bus 303, an output channel 304, and an output patch 305.

The input patch 301 receives an input of an audio signal from a plurality of input ports (an analog input port or a digital input port, for example) in the audio I/O 13 and assigns any one of a plurality of ports to at least one of a plurality of channels (32 channels, for example). As a result, the audio signal is supplied to each channel in the input channel 302.

Figure 4:
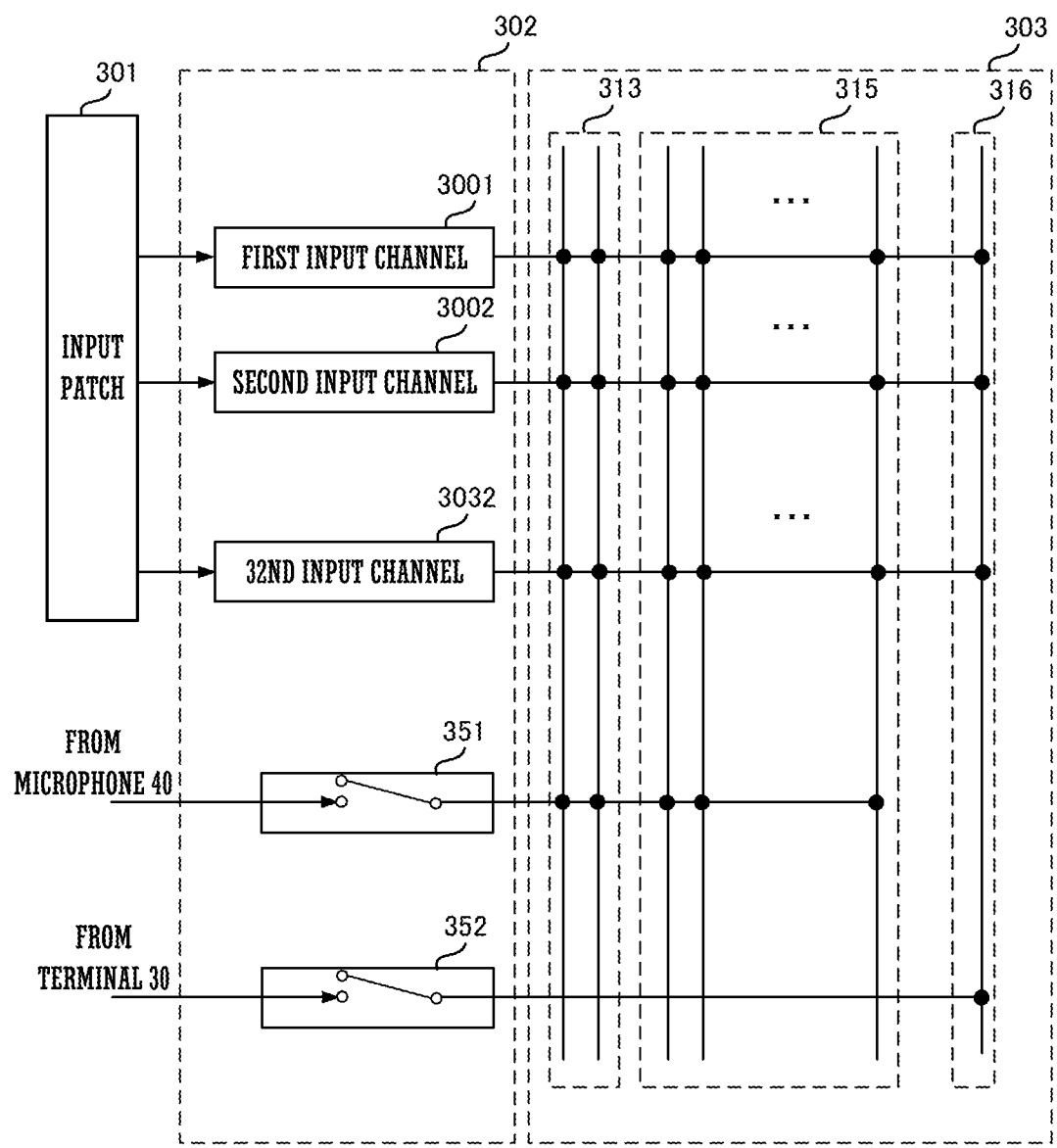
FIG. 4 is a diagram showing a functional configuration of an input channel 302 and a bus 303.

FIG. 4 is a diagram showing a functional configuration of the input channel 302 and the bus 303. The input channel 302 includes a plurality of signal processing blocks, for example, in order from a signal processing block 3001 of a first input channel, and a signal processing block 3002 of a second input channel, to a signal processing block 3032 of a 32nd input channel. Each signal processing block performs various types of signal processing such as an equalizing or compressing, to the audio signal supplied from the input patch 301.

The bus 303 includes a stereo bus 313, a MIX bus 315, and a monitor bus 316. Each signal processing block of the first input channel to the 32nd input channel inputs the audio signal on which the signal processing has been performed, to the stereo bus 313, the MIX bus 315, and the monitor bus 316. Each signal processing block of the first input channel to the 32nd input channel sets an outgoing level with respect to each bus.

The stereo bus 313 corresponds to a stereo channel used as a main output in the output channel 304. The MIX bus 315, for example, corresponds to a monitor speaker (a speaker 20, for example) of a performer. In other words, the MIX bus 315 is an example of a monitor bus for a performer. The monitor bus 316 corresponds to a monitor speaker (a speaker 50, for example) for an engineer. Each of the stereo bus 313, the MIX bus 315, and the monitor bus 316 mixes inputted audio signals. Each of the stereo bus 313, the MIX bus 315, and the monitor bus 316 outputs the mixed audio signals to the output channel 304.

The output channel 304, as with the input channel 302, performs various types of signal processing on the audio signal inputted from the bus 303. The output channel 304 outputs the audio signal on which the signal processing has been performed, to the output patch 305. The output patch 305 assigns each output channel to at least one of a plurality of ports serving as an analog output port or a digital output port. As a result, the output patch 305 supplies the audio signal on which the signal processing has been performed, to the audio I/O 13.

Figure 5:
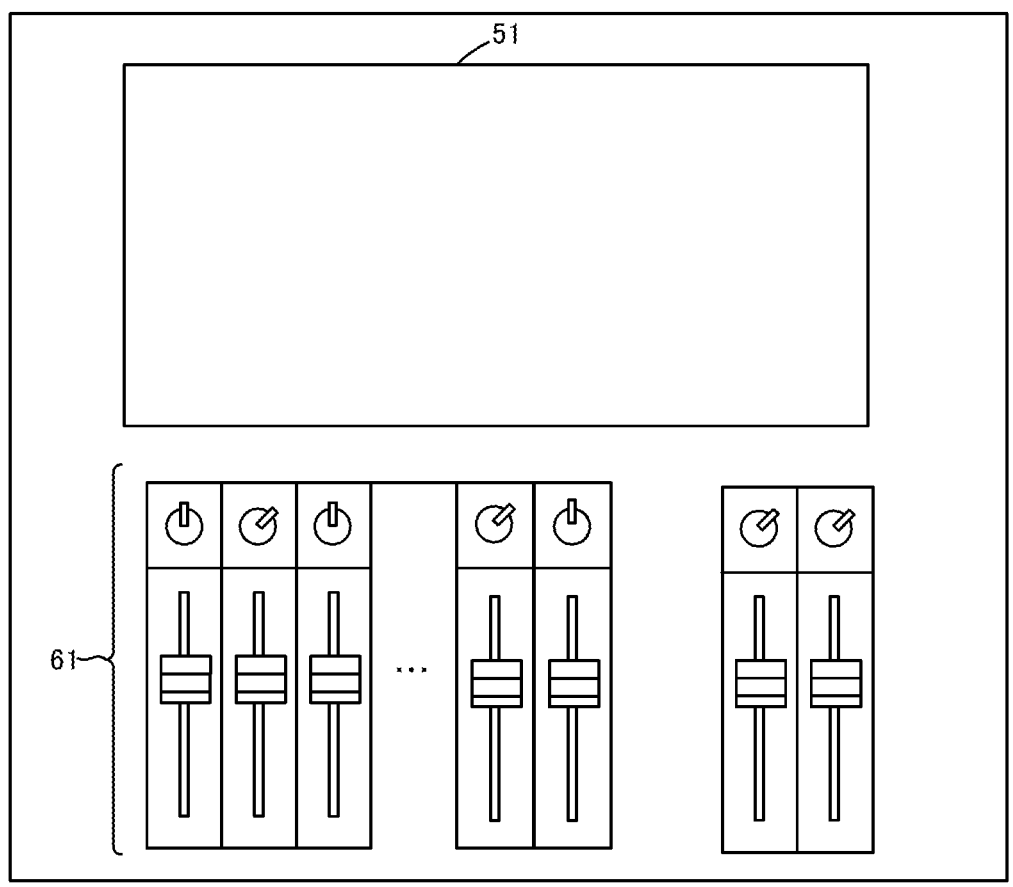
FIG. 5 is a diagram showing a configuration of an operation panel of a mixer 10.

An engineer sets a parameter of the above-described various types of signal processing, through the operator 12. FIG. 5 is a diagram showing a configuration of an operation panel of the mixer 10. As shown in FIG. 5, the mixer 10 includes, on the operation panel, a touch screen 51 and a channel strip 61. Such components correspond to the display 11 and the operator 12 shown in FIG. 1. It is to be noted that, although FIG. 5 only shows the touch screen 51 and the channel strip 61, a large number of knobs, switches, or the like may be provided in practice.

The touch screen 51 is the display 11 obtained by stacking the touch panel being one preferred embodiment of the operator 12, and constitutes a GUI (Graphical User Interface) for receiving an operation from a user.

The channel strip 61 is an area in which a plurality of physical controllers that receive an operation with respect to one channel are disposed vertically. Although FIG. 5 only shows one fader and one knob for each channel as the physical controllers, a large number of knobs, switches, or the like may be provided in practice. In the channel strip 61, a plurality of faders and knobs disposed on the left side correspond to the input channel 302. The two faders and two knobs disposed on the right side are physical controllers corresponding to the master output. An engineer operates a fader and a knob, sets a gain of each input channel (from the first input channel to the 32nd input channel in a case of 32 channels, for example), or sets an outgoing level with respect to the bus 303.

Figure 6:
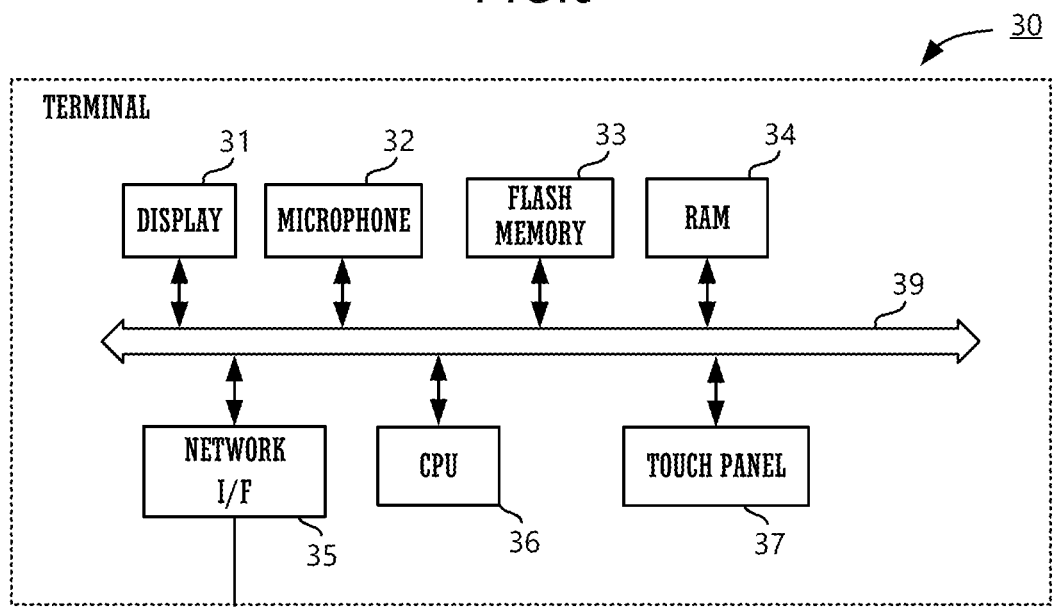
FIG. 6 is a block diagram showing a configuration of a terminal 30.

FIG. 6 is a block diagram showing a configuration of the terminal 30. The terminal 30 includes a display 31, a microphone 32, a flash memory 33, a RAM 34, a network I/F 35, a CPU 36, and a touch panel 37. The display 31, the microphone 32, the flash memory 33, the RAM 34, the network I/F 35, the CPU 36, and the touch panel 37 are connected to each other through a bus 39.

The network I/F 35 communicates with another apparatus such as the mixer 10 through a network. The network I/F 35 sends various types of information to the mixer 10 through the network.

The CPU 36 reads out a program stored in the flash memory 33 being a storage medium to the RAM 34 and implements various types of functions. It is to be noted that the program that the CPU 36 reads out does not also need to be stored in the flash memory 33 in the own apparatus. For example, the program may be stored in a storage medium of an external apparatus such as a server. In such a case, the CPU 36 may read out the program each time from the server to the RAM 34 and may execute the program.

Figure 7:
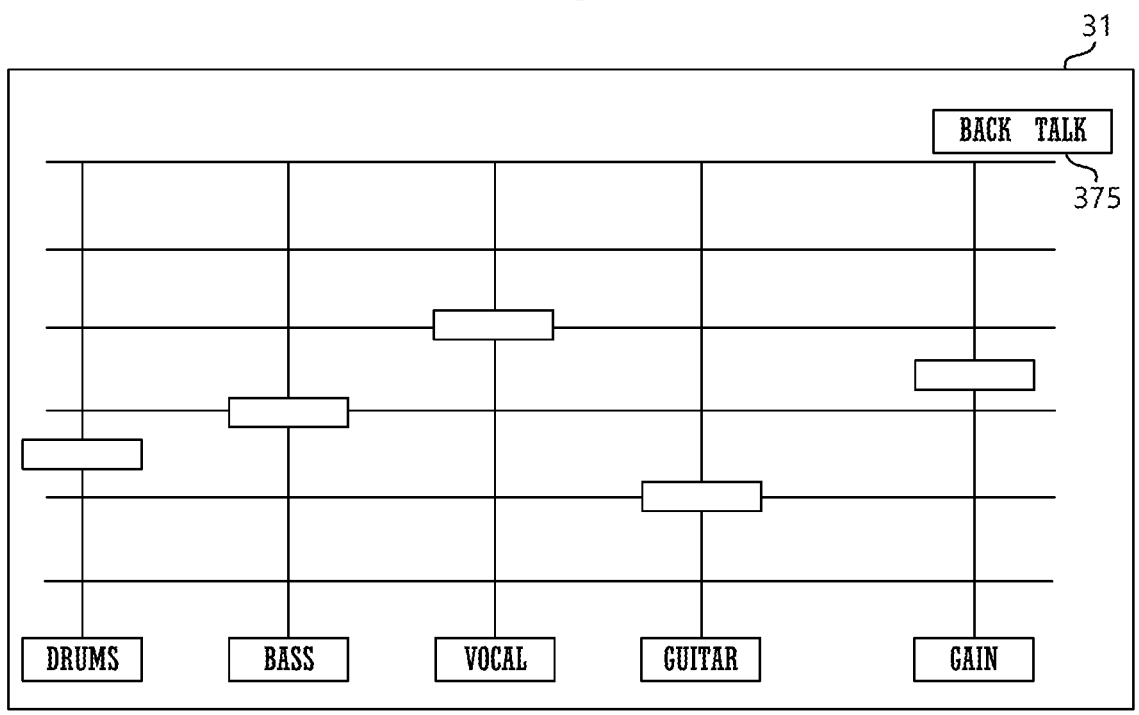
FIG. 7 shows an example of a screen displayed on a display 31.

FIG. 7 shows an example of a screen displayed on the display 31. It is to be noted that the display 31 includes the touch panel 37 stacked on the display 31, and constitutes a GUI together with the touch panel 37. The touch panel is an example of a receptor. The display 31 displays a setting screen for performing a volume setting as shown in FIG. 7. A performer, on the setting screen, sets the volume of sound according to an audio signal to be sent out to the speaker 20 being a monitor speaker for a performer.

On the setting screen, names of each performance sound or each singing sound corresponding to an input channel are arranged. The vertical direction corresponds to volume (gain). In this example, a drum (DRUMS), a base (BASS), a vocal (VOCAL), and a guitar (GUITAR) are displayed along in the horizontal direction. A bar that moves in the vertical direction is displayed at a position at which each performance sound or each singing sound is displayed.

A performer, by touching the display 31 on which the touch panel 37 is stacked and performing a swipe operation to move the bar up and down, can change the outgoing level of the input channel corresponding to each name. For example, when the bar of the DRUMS is moved upward, from the input channel corresponding to the DRUMS, the outgoing level with respect to the MIX bus 315 corresponding to the monitor speaker of the performer is able to be increased.

The CPU 36 of the terminal 30 sends information according to the volume setting received by the touch panel 37, to the mixer 10. The information according to the volume setting includes information to specify the MIX bus 315 and information on the outgoing level. The mixer 10 receives the information according to the volume setting from the terminal 30 and sets an outgoing level with respect to the corresponding MIX bus 315.

Subsequently, when the performer touches a backtalk button 375 in the setting screen, the backtalk function is enabled. When the backtalk function is enabled, the performer can talk with an engineer using the microphone 32 of the terminal 30.

Figure 8:
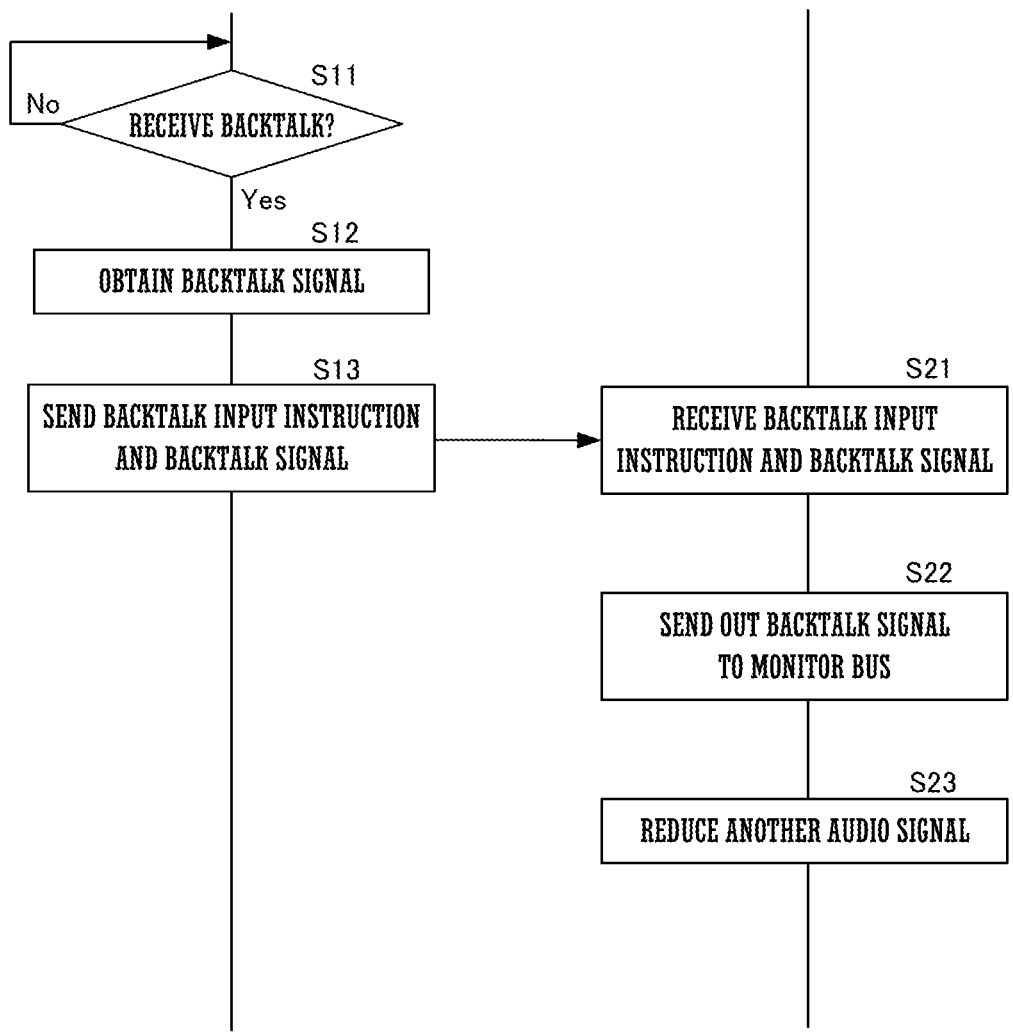
FIG. 8 is a flow chart showing an operation of the audio signal processing system.

FIG. 8 is a flow chart showing an operation of the audio signal processing system. First, the CPU 36 of the terminal 30 determines whether or not a backtalk input instruction has been received (S11). For example, when a performer touches the backtalk button 375 in the setting screen, the CPU 36 receives a backtalk input instruction. The CPU 36 repeats the determination of S11 until receiving a backtalk input instruction.

The CPU 36, when receiving a backtalk input instruction, obtains an audio signal obtained by the microphone 32 as a backtalk signal (S12). Then, the CPU 36 sends the backtalk input instruction and the backtalk signal through the network I/F 35 (S13).

The CPU 19 of the mixer 10 receives the backtalk input instruction and the backtalk signal through the network I/F 18 (S21). The CPU 19 sets the signal processor 14 so as to send out the backtalk signal to the monitor bus 316 (S22). For example, the signal processor 14, in the input channel 302 shown in FIG. 4, sets the backtalk switch 352 to an ON state. The signal processor 14, when setting the backtalk switch 352 to the ON state, comes into the state of sending out the backtalk signal received from the terminal 30 to the monitor bus 316. As a result, the signal processor 14 outputs the backtalk signal obtained by the microphone 32 to the speaker 50 being a monitor speaker for an engineer. Therefore, the engineer can listen to the voice of a performer.

In such a manner, an audio signal processing system according to a preferred embodiment of the present invention is able to use a backtalk function at a desired timing of a performer. In addition, the audio signal processing system according to a preferred embodiment of the present invention is able to use the backtalk function, without a need to perform a complicated setup.

In addition, when the backtalk function is enabled, the signal processor 14 reduces the level of an audio signal other than a backtalk signal (S23). As shown in FIG. 4, signals of the signal processing block 3001 to the signal processing block 3032 are also inputted to the monitor bus 316. Therefore, in a state in which the backtalk function is not enabled, the engineer is in a state of listening to sound of any input channel. In such a state, even when the backtalk signal is sent out to the monitor bus 316, the engineer can listen to the voice of a performer. In such a case, when the signal processor 14 reduces the level of an audio signal other than a backtalk signal, the engineer can clearly listen to the voice of a performer. However, the processing of S23 is not essential in the present invention.

It is to be noted that the mixer 10 is connected to the microphone 40. The microphone 40 is a talkback microphone for talking from an engineer to a performer. An engineer operates the operator 12 of the mixer 10, and turns on a talkback function. The mixer 10 receives a talkback input instruction, for example through a talkback button provided on the operation panel. In such a case, the signal processor 14 outputs a talkback signal according to voice obtained by the microphone 40 to a monitor bus for a performer other than the monitor bus 316. In the example of FIG. 4, the signal processor 14 turns on a talkback switch 351 in the input channel 302. The signal processor 14, when turning on the talkback switch 351, sends out the talkback signal received from the microphone 40, to a bus other than the monitor bus 316. As a result, the signal processor 14 outputs the talkback signal obtained by the microphone 40 to the speaker 20 being a monitor speaker for a performer. Therefore, the performer can listen to the voice of an engineer.

In addition, when the talkback function is enabled, the signal processor 14 may reduce the level of an audio signal other than a talkback signal. When the signal processor 14 reduces the level of an audio signal other than a talkback signal, the performer can clearly listen to the voice of an engineer.

It is to be noted that backtalk voice is not limited to an example of outputting from the speaker 50. For example, the mixer 10 may connect to a terminal (a second terminal) that an engineer uses, and may output the backtalk voice from the speaker of the terminal that the engineer uses.

Figure 9:
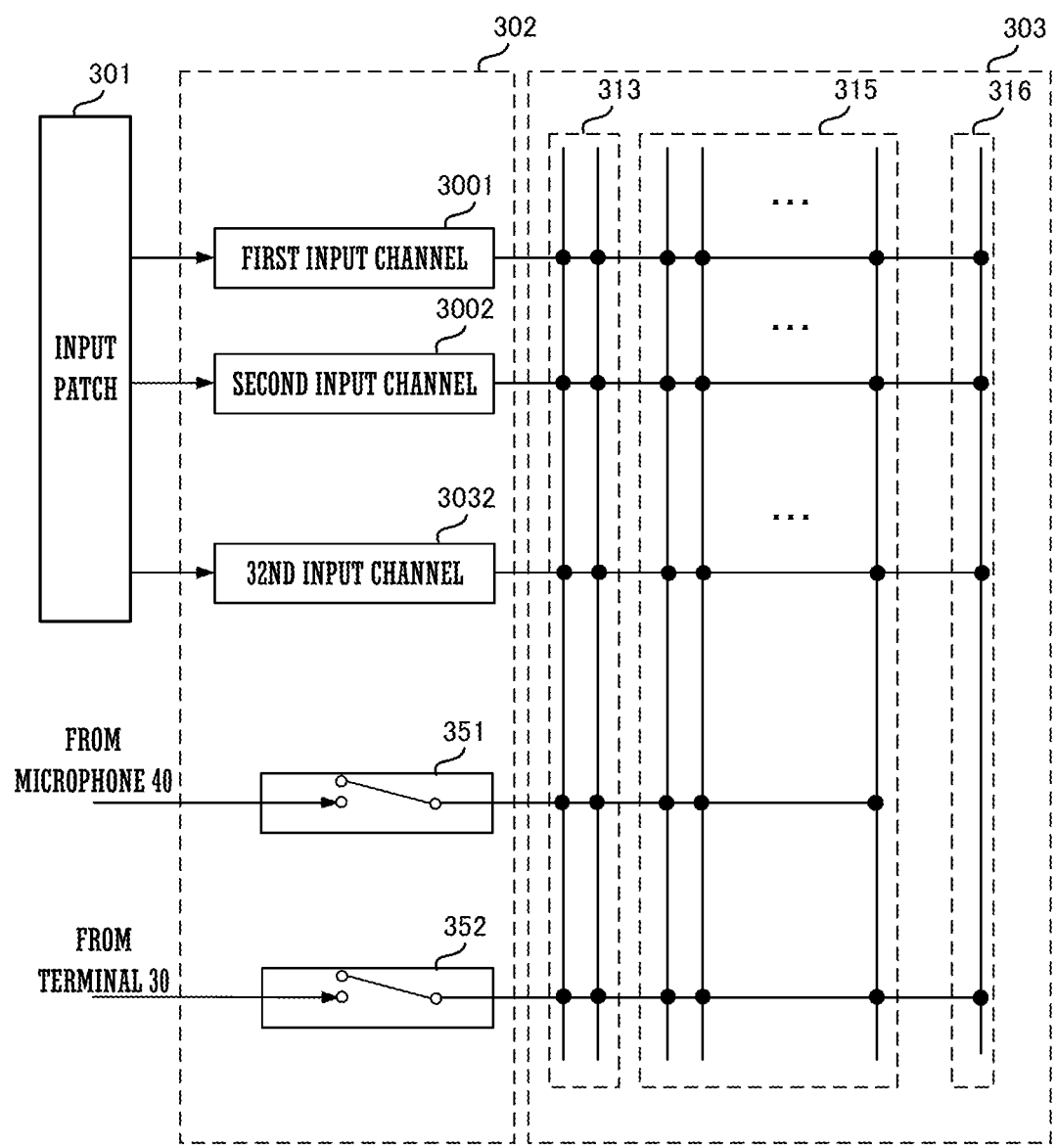
FIG. 9 is a diagram showing a functional configuration of another input channel 302 and another bus 303.

Next, FIG. 9 is a diagram showing a functional configuration of an input channel 302 and a bus 303 according to a modification. The signal processor 14 according to the modification, when turning on the backtalk switch 352, sends out the backtalk signal received from the terminal 30 not only to the monitor bus 316 but to a specified bus. Therefore, the voice of the performer when the backtalk function is turned on is outputted not only from a monitor speaker of an engineer but also from any specified monitor speaker of a performer.

FIG. 10 is a flow chart showing an operation of an audio signal processing system according to a modification. The same reference numerals are used to refer to processing common to the processing shown in FIG. 8, and the description is omitted. The CPU 36 of the terminal 30, in a case of determining that a backtalk input instruction has been received in S11, further receives a specification of an outgoing destination of the backtalk signal (S102). A performer, by selecting a name of each performance sound or each singing sound on the setting screen shown in FIG. 7, for example, can specify the outgoing destination of a backtalk signal.

The CPU 36 of the terminal 30 sends a backtalk input instruction, a backtalk signal, and information on the outgoing destination, through the network I/F 35 (S103).

The CPU 19 of the mixer 10 receives the backtalk input instruction, the backtalk signal, and the information on the outgoing destination, through the network I/F 18 (S201). The CPU 19, based on the information on the outgoing destination, sets the signal processor 14 so as to send out the backtalk signal to a bus of the specified outgoing destination (S202). For example, the signal processor 14, in the input channel 302 shown in FIG. 9, sets the backtalk switch 352 to an ON state. The signal processor 14, when turning on the backtalk switch 352, comes into the state of sending out the backtalk signal received from the terminal 30 to the stereo bus 313, the MIX bus 315, and the monitor bus 316. Further, the signal processor 14, based on the information of the outgoing destination, sets a high outgoing level with respect to the specified bus of the outgoing destination and sets a low outgoing level with respect to other buses (S23). As a result, the signal processor 14 outputs the backtalk signal obtained by the microphone 32 to any specified speaker. Therefore, the performer can talk with any specified performer or engineer.

It is to be noted that, even in the modification, the backtalk voice is not limited to an example of outputting from the speaker 20. For example, the mixer 10 may connect to a terminal that each performer uses, and may output the backtalk voice from the speaker of the terminal that the performer uses.

The description of the foregoing preferred embodiments is illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

For example, in the present preferred embodiment, the terminal 30, on a volume setting screen, displays an icon image (the backtalk button 375) for receiving the backtalk input instruction. However, the method of receiving a backtalk input instruction is not limited to such a example. For example, the terminal 30, in a case of receiving a swipe operation using two fingers as a specific operation on the setting screen, may receive a backtalk input instruction. In such a case, the terminal 30 changes a display from the volume setting screen to a dedicated screen for the backtalk function. In addition, the terminal 30 does not need to receive a backtalk input instruction through the touch panel 37. For example, the terminal 30 may receive a backtalk input instruction by an operation with respect to a physical switch.

What is claimed is:

1. An audio signal processing method performed by a non-mixer terminal excluding a capability to perform mixing processing of a plurality of input audio signals and being configured to communicate with a mixer configured to perform the mixing processing of the plurality of input audio signals, the mixer comprising a plurality of audio Input/Output (I/O) interfaces and a plurality of buses including (i) a monitor bus configured to send an audio signal to a monitor of an operator of the mixer and (ii) a bus different from the monitor bus, the audio signal processing method comprising:

receiving, by the non-mixer terminal excluding the capability to perform the mixing processing of the plurality of input audio signals, (i) a backtalk input instruction from a performer using the non-mixer terminal, the backtalk input instruction being an instruction that instructs the non-mixer terminal to send a backtalk signal to the mixer, and (ii) a specification of a bus among the plurality of buses of the mixer as a destination of the backtalk signal;

obtaining, by a microphone of the non-mixer terminal, voice information from the performer, the backtalk signal to be sent to the mixer corresponding to the voice information obtained by the microphone; and sending the backtalk input instruction, the backtalk signal, and information indicating the destination of the backtalk signal to an audio I/O interface among the plurality of audio I/O interfaces of the mixer to thereby cause the mixer to output, in a case where the backtalk input instruction, the backtalk signal, and the information indicating the destination of the backtalk signal have been received from the non-mixer terminal, the backtalk signal corresponding to the voice information obtained by the microphone to the monitor bus of the mixer and to the specified bus among the plurality of buses of the mixer.

2. The audio signal processing method according to claim 1, further comprising:
displaying, by the non-mixer terminal, a setting screen for receiving a volume setting of a sound according to an audio signal to be outputted from the mixer; and
further displaying, by the non-mixer terminal, a button for receiving the backtalk input instruction, on the setting screen.

3. The audio signal processing method according to claim 2, wherein
the non-mixer terminal includes a touch panel; and
the backtalk input instruction is received by an operation being detected by the touch panel.

4. The audio signal processing method according to claim 1, further comprising outputting a talkback signal corresponding to voice information obtained by a talkback microphone to the bus different from the monitor bus.

5. The audio signal processing method according to claim 4, further comprising reducing a level of an audio signal other than the backtalk signal when outputting the backtalk signal to the monitor bus.

6. The audio signal processing method according to claim 1, wherein the specified bus of the mixer, to which the backtalk signal is output, outputs the backtalk signal to a second non-mixer terminal connected to the mixer, the second non-mixer terminal excluding the capability to perform the mixing processing of the plurality of input audio signals and being configured to communicate with the mixer via an audio I/O interface among the plurality of audio I/O interfaces of the mixer.

7. The audio signal processing method according to claim 1, further comprising displaying, by the non-mixer terminal, information indicating the destination of the backtalk signal.

8. The audio signal processing method according to claim 1, wherein the microphone of the non-mixer terminal is included in the non-mixer terminal, and the non-mixer terminal is a personal computer (PC), a smartphone, or a tablet PC.

9. An audio signal processing system comprising:
a mixer configured to perform mixing processing of a plurality of input audio signals, the mixer comprising a plurality of audio Input/Output (I/O) interfaces and a plurality of buses including (i) a monitor bus configured to send an audio signal to a monitor of an operator of the mixer and (ii) a bus different from the monitor bus; and
a non-mixer terminal excluding a capability to perform the mixing processing of the plurality of input audio signals and being configured to communicate with the mixer via an audio I/O interface among the plurality of audio I/O interfaces of the mixer,
wherein the non-mixer terminal excluding the capability to perform the mixing processing of the plurality of input audio signals comprises:
a receptor configured (i) to receive a backtalk input instruction from a performer using the non-mixer terminal, the backtalk input instruction being an instruction that instructs the non-mixer terminal to send a backtalk signal to the mixer, and (ii) to receive a specification of a bus among the plurality of buses of the mixer as a destination of the backtalk signal;
a microphone configured to obtain voice information from the performer, the backtalk signal to be sent to the mixer corresponding to the voice information obtained by the microphone; and
an interface configured to send the backtalk input instruction, the backtalk signal, and information indicating the destination of the backtalk signal to the audio I/O interface among the plurality of audio I/O interfaces of the mixer; and
wherein the mixer configured to perform the mixing processing of the plurality of input audio signals further comprises:
a signal processor configured to output, in a case where the backtalk input instruction, the backtalk signal, and the information indicating the destination of the backtalk signal have been received from the non-mixer terminal, the backtalk signal corresponding to the voice information obtained by the microphone to the monitor bus and to the specified bus among the plurality of buses of the mixer.

10. The audio signal processing system according to claim 9, wherein
the non-mixer terminal further comprises:
a display; and
a controller configured to cause the display to display a setting screen for receiving a volume setting of an audio signal to be outputted from the mixer,
wherein the controller is further configured to cause the display to display a button for receiving the backtalk input instruction on the setting screen.

11. The audio signal processing system according to claim 10, wherein
the non-mixer terminal further comprises a touch panel; and
the receptor is configured to receive the backtalk input instruction by an operation being detected by the touch panel.

12. The audio signal processing system according to claim 9, further comprising a talkback microphone, wherein
the signal processor is configured to output a talkback signal according to voice information obtained by the talkback microphone to the bus different from the monitor bus.

13. The audio signal processing system according to claim 12, wherein the signal processor, when outputting the backtalk signal to the monitor bus, is configured to reduce a level of an audio signal other than the backtalk signal.

14. The audio signal processing system according to claim 9, wherein the specified bus of the mixer is configured to output the backtalk signal to a second non-mixer terminal connected to the mixer, the second non-mixer terminal excluding the capability to perform the mixing processing of the plurality of input audio signals and being configured to communicate with the mixer via an audio I/O interface among the plurality of audio I/O interfaces of the mixer.

15. The audio signal processing system according to claim 9, wherein the non-mixer terminal is configured to display information indicating the destination of the backtalk signal.

16. A non-transitory computer readable storage medium storing computer-executable instructions, which when executed by a computer, cause the computer to perform an audio signal processing method using a mixer configured to perform mixing processing of a plurality of input audio signals, the mixer comprising a plurality of audio Input/Output (I/O) interfaces and a plurality of buses including (i) a monitor bus configured to send an audio signal to a monitor of an operator of the mixer and (ii) a bus different from the monitor bus, and a non-mixer terminal excluding a capability to perform the mixing processing of the plurality of input audio signals and being configured to communicate with the mixer via an audio I/O interface of the mixer, the audio signal processing method comprising:

causing the non-mixer terminal excluding the capability to perform the mixing processing of the plurality of input audio signals to receive (i) a backtalk input instruction from a performer using the non-mixer terminal, the backtalk input instruction being an instruction that instructs the non-mixer terminal to send a backtalk signal to the mixer, and (ii) a specification of a bus among the plurality of buses of the mixer as a destination of the backtalk signal;

causing the non-mixer terminal to obtain voice information from the performer by using a microphone of the non-mixer terminal, the backtalk signal to be sent to the mixer corresponding to the voice information obtained by the microphone;

causing the non-mixer terminal to send the backtalk input instruction, the backtalk signal, and information indicating the destination of the backtalk signal to the audio I/O interface among the plurality of audio I/O interfaces of the mixer; and causing the mixer configured to perform the mixing processing of the plurality of input audio signals to output the backtalk signal corresponding to the voice information obtained by the microphone to the monitor bus of the mixer and to the specified bus among the plurality of buses of the mixer, in a case where the backtalk input instruction, the backtalk signal, and the information indicating the destination of the backtalk signal have been received from the non-mixer terminal.

17. The audio signal processing system according to claim 9, wherein the microphone of the non-mixer terminal is included in the non-mixer terminal, and the non-mixer terminal is a personal computer (PC), a smartphone, or a tablet PC.

* * * * *